United States Patent [19]

Russell

[11] 4,029,937
[45] June 14, 1977

[54] CONTROL SYSTEM FOR ELECTRICALLY CONDUCTIVE LIQUID HEATING APPARATUS

[76] Inventor: Robert G. Russell, 21011 S. Figueroa St., Carson, Calif. 90745

[22] Filed: Oct. 4, 1974

[21] Appl. No.: 512,093

[52] U.S. Cl. .............................. 219/295; 219/285; 219/292; 219/331; 219/497; 219/501; 307/117; 307/131

[51] Int. Cl.² .................. H05B 3/60; H05B 1/02; F24H 1/10

[58] Field of Search .......................... 219/271–276, 219/284–295, 501, 497, 499, 498, 331; 307/117, 116, 131

[56] References Cited

UNITED STATES PATENTS

| | | | |
|---|---|---|---|
| 891,254 | 6/1908 | Hill | 219/285 X |
| 2,572,337 | 10/1951 | Harris | 219/285 |
| 2,618,732 | 11/1952 | Bernd | 219/285 X |
| 3,513,291 | 5/1970 | Mamoulides et al. | 219/293 X |
| 3,517,162 | 6/1970 | Webb | 219/295 UX |
| 3,590,323 | 6/1971 | Mapham | 219/295 UX |
| 3,651,753 | 3/1972 | Schmidt | 219/501 |
| 3,678,247 | 7/1972 | Sawa et al. | 219/501 |
| 3,821,516 | 6/1974 | Hayes et al. | 219/497 |
| 3,909,588 | 9/1975 | Walker et al. | 219/295 |

Primary Examiner—A. Bartis
Attorney, Agent, or Firm—Poms, Smith, Lande & Glenny

[57] ABSTRACT

Electrically resistive liquids such as tap water are heated in an all solid state electrical apparatus. Spaced inner and outer conically shaped electrodes provide a flow path for the water or other liquid which is heated to a preselected temperature by selectively passing alternating current between the electrodes and through the partially conductive liquid. The resistivity of the liquid dissipates the electrical energy in the form of heat which thus increases the temperature of the flowing liquid. Rapid, safe and effective control over the electrical current flowing between the conical electrodes is achieved by an electrical control circuit including a solid state alternating current switching device, a current sensing circuit, a temperature sensing circuit and a logic circuit for selective control of the switching device. Predetermined conditions of the temperature and current sensing circuits cause the logic circuit to selectively trigger the solid state switching device into conduction for passing a sufficient number of half or full cycles of alternating current to the electrodes to achieve the desired temperature rise and steady state temperature level of the flowing liquid.

7 Claims, 7 Drawing Figures

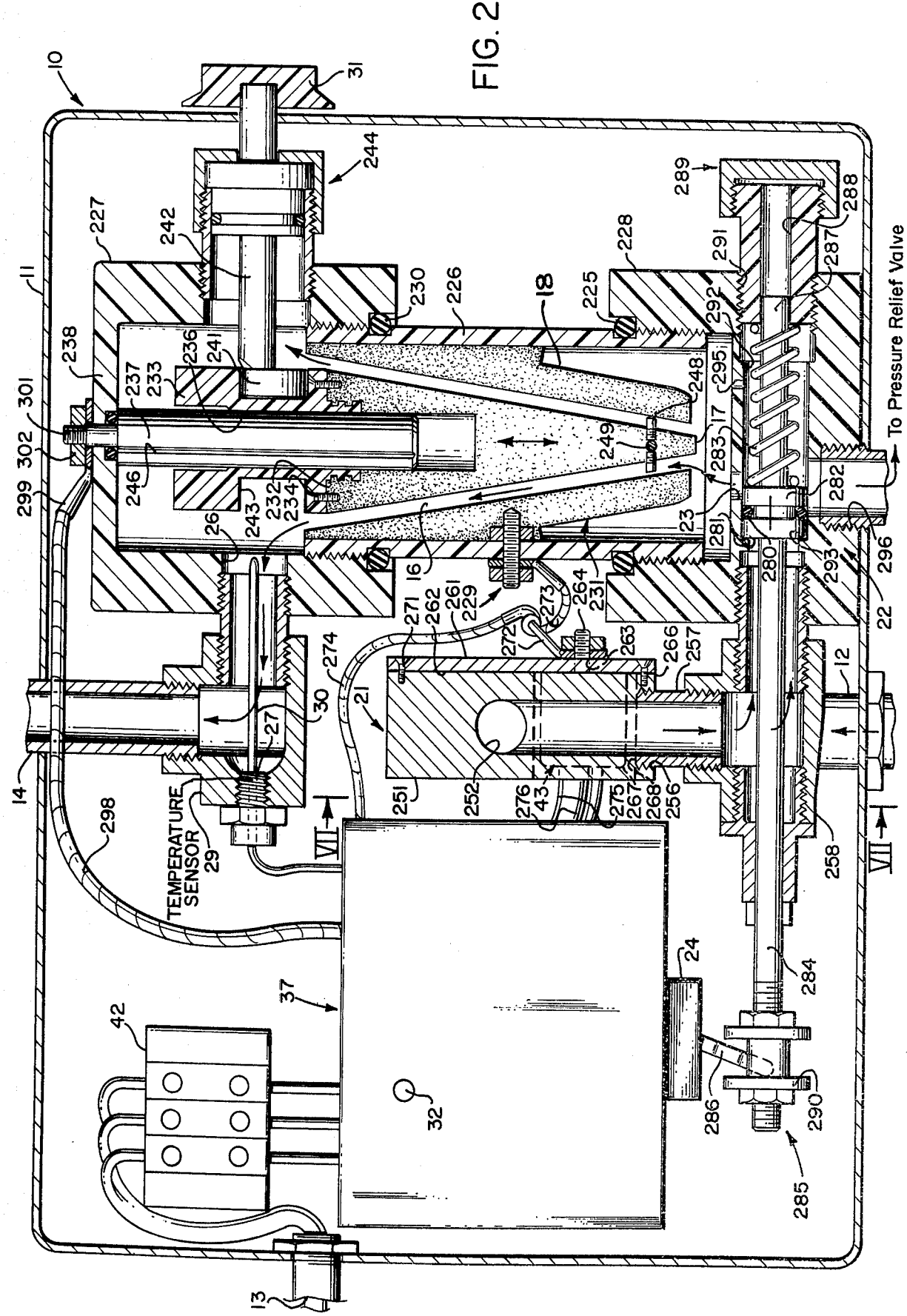

CONTROL SYSTEM FOR ELECTRICALLY CONDUCTIVE LIQUID HEATING APPARATUS

BACKGROUND

The present invention relates to general to systems, devices and apparatus for heating liquids. More particularly, the present invention relates to an apparatus for heating electrically resistive liquids by passing electrical current through the liquid itself.

In this type of apparatus, the liquid because of its chemical composition, impurities or other physical characteristics functions as a resistive body capable of passing electrical current between two oppositely charged electrodes. The resistivity of the liquid transforms the electrical energy into heat which in turn increases the temperature of the liquid.

Tap water or in general water having sufficient mineral content to conduct electrical current is one of the liquids which is particularly suited for this type of heating. Theoretically, heating tap water by this electrical process is a very efficient technique because most of the input electrical energy is dissipated directly in the water in the form of heat. Furthermore, heating of the water may be performed instantly as it flows from the tap, eliminating or in some cases advantageously complimenting large, hot water storage tanks. While a conventional electric or gas hot water storage tank is limited in its ability to supply unlimited hot water during intervals of heavy use, the electrical resistance type of heater is capable of continuously supplying hot water or other heated fluids indefinitely.

Although generally this type of heating has been known for many years, none of the heretofore proposed devices have been as commercially successful as would be expected from the theroretical advantages of this type of liquid heating. Examples of prior art devices utilizing this heating principle are found in U.S. Pat. Nos. 2,529,688; 2,618,732; 727,361; 2,403,334; 2,572,337 and 2,748,253. Even though these and other electrical heaters operating on the liquid resistance principle have been proposed, it does not appear that any of these devices have enjoyed significant commercialization. It is believed that one reason for the lack of instant success of these devices can be attributed to several significant technical problems encountered in their operation.

The principle among these difficulties is the nonuniformity and variability of the conductivity or resistivity of the liquid. In particular, tap water varies in mineral content and thus conductivity depending upon the source of the water. Moreover, the conductivity of a given source of water may vary from time to time, thus resulting in a variable conductivity. Usually, two or more oppositely poled electrodes are used to provide a flow of current through the water flow. As the conductivity increases for example, the current flow also increases and the water for a given electrode voltage may become excessively hot. Additionally, excessive current may flow, overloading the power source.

A sudden increase in the water conductivity can result in instant scalding temperatures thus making the device potentially dangerous for ordinary household use. Although attempts have been made to solve this problem of varying water conductivity, none of these attempts have resulted in a practical, commercially feasible solution.

Another typical shortcoming of prior devices has been their inability to respond with sufficient speed for controlling the temperature level of the flowing water or other liquid. It will be appreciated that the water may be flowing through the heating device at a rapid rate and because of this it is necessary for the system to rapidly respond to the instantaneous temperature of the flowing water. In other words, the electrical energy supplied to the electrodes for heating the water must be highly responsive to the water temperature in order to add the necessary heat to the continuously flowing stream. Without such responsiveness, the system may result in hot and/or cold spots of water flow which detract from the performance of the device.

Still another technical problem which heretofore has not been adequately solved is found in the difficulty of switching the large currents required for heating the liquid. As an example of this, approximately 80 to 140 amperes of current may be required for raising the temperature of ambient tap water to a customary "hot" water temperature. At these current levels, it is difficult to quickly control the amount of electrical energy applied to the electrodes of the device. Simple switching devices are not satisfactory because of their propensity to arc at these current magnitudes. Even with the use of solid state switching devices, abrupt initiation and termination of such large current flows leads one to believe that a practical, economical, long lasting device operating under these requirements is not foreseeable from the technology heretofore developed on heaters of this nature.

It is an object of the present invention to provide an electrical apparatus for heating resistive liquids which solves the above and other problems encountered in the construction of a practical and commercially acceptable heating system.

This and further objects and various advantages of the electrical apparatus for heating resistive liquids according to the present invention will become apparent to those skilled in the art from a consideration of the following detailed description and appended drawings of an exemplary embodiment thereof.

BRIEF DESCRIPTION OF THE DRAWINGS

FIG. 2 is an enlarged, sectional view of the apparatus shown in FIG. 1 with the section taken generally along lines II-II of FIG. 1.

DESCRIPTION OF THE PREFERRED EMBODIMENTS

Figure 1:
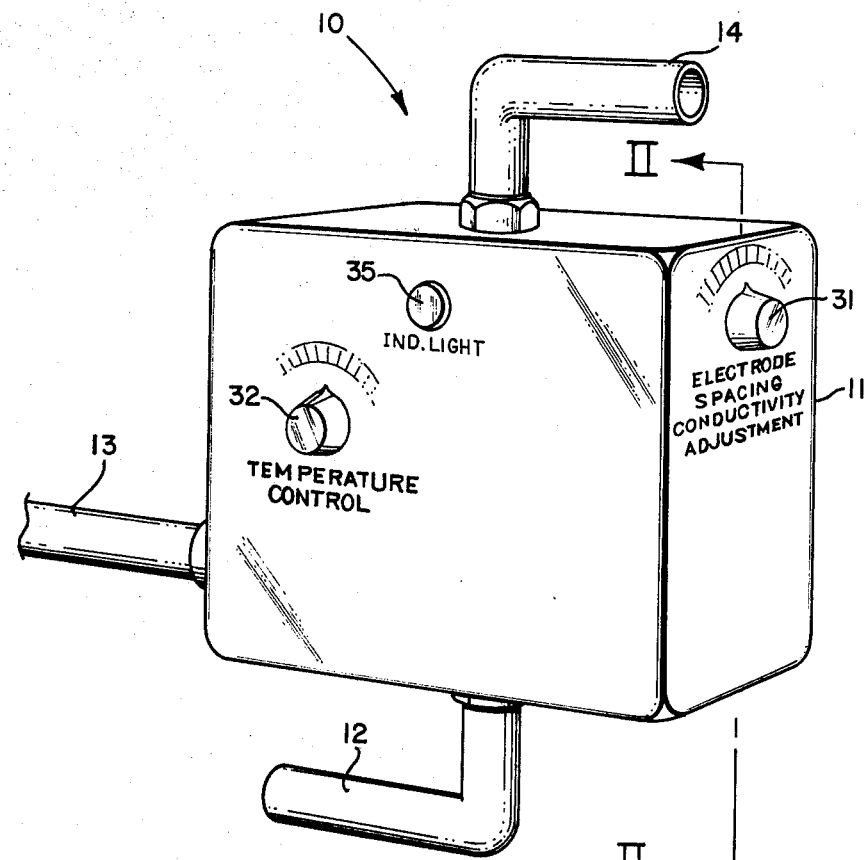
FIG. 1 is a perspective view of a preferred embodiment of the electrical apparatus for heating liquids constructed in accordance with the present invention.
Figure 3:
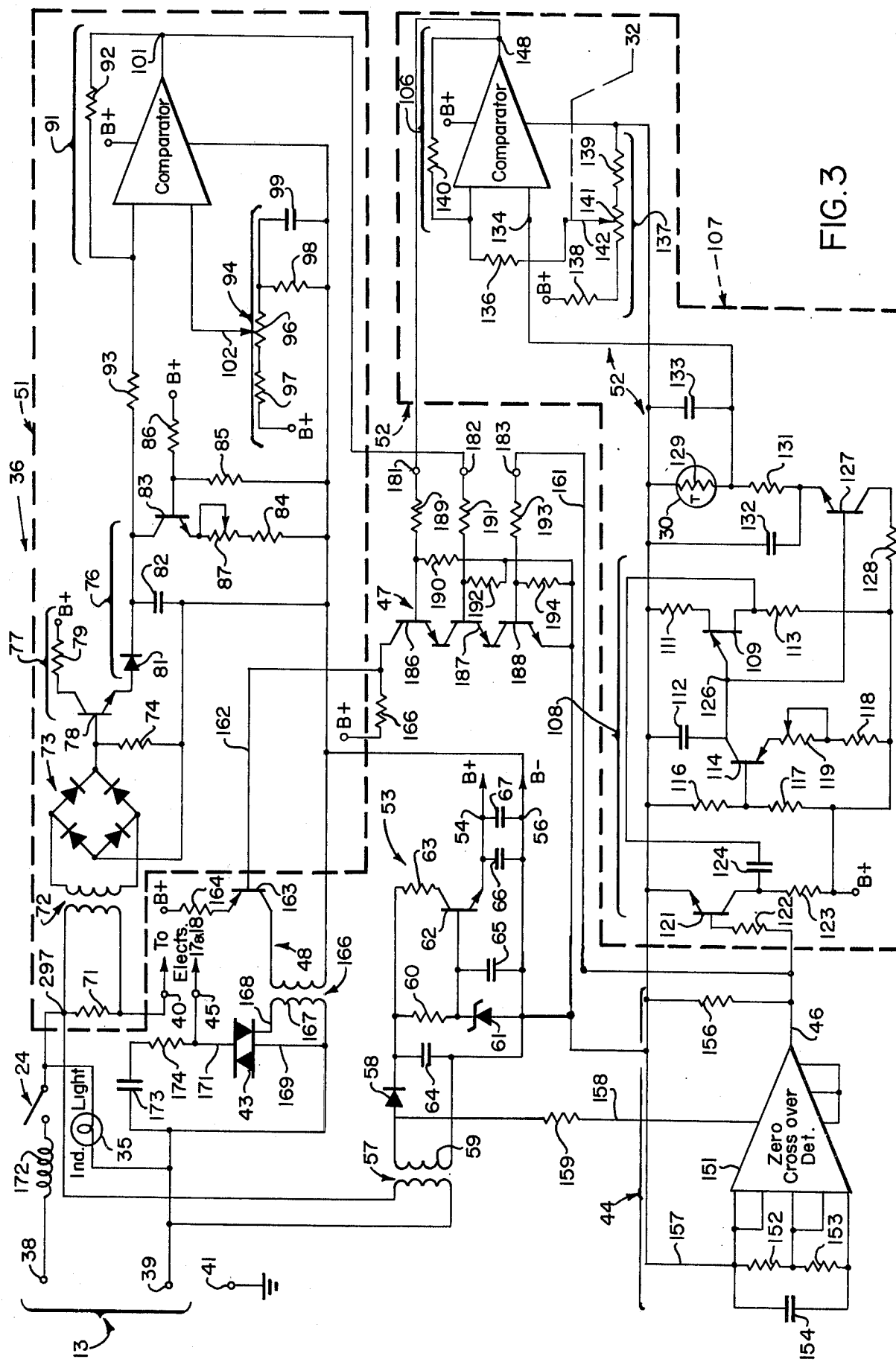
FIG. 3 is a detailed schematic diagram of one preferred embodiment of the electrical control circuit for the apparatus shown in FIGS. 1 and 2.

With reference to FIGS. 1, 2 and 3, an apparatus 10 for heating electrically resistive liquids, such as ordinary tap water, is provided in a compact, easily mounted housing 11. Housing 11 occupies a fraction of the space normally required for storage type water or other liquid heaters having an equivalent output capacity.

The resistive liquid such as tap water is introduced through an inlet piping or conduit 12, heated within housing 11 by electrical energy supplied from a line voltage source 13, and discharged at a selected, elevated temperature through an outlet piping or conduit 14. As best shown in FIG. 2, the actual heating of the fluid takes place in a conical shaped flow channel 16 defined by inner and outer, mated conical electrodes 17 and 18, respectively. In order to closely monitor and control the degree of heating of the liquid and to prevent excessive electrical current flow between electrodes 17 and 18, an electrical control circuit is provided as best shown in FIG. 3. To a large extent, the successful operation of the heating apparatus shown in FIGS. 1 and 2 depends upon the effectiveness and reliability of the electrical control circuit constructed in accordance with this preferred embodiment of the invention.

Although the embodiments of the present invention disclosed herein are intended for use in heating undistilled water or other resistive liquids in which the flow is intermittent. For example, in a typical residential, business office or industrial installation, apparatus 10 may be connected adjacent a flow control valve such as a lavatory faucet or the like in order to produce hot water only as demanded in response to opening of the faucet. For this purpose and as disclosed herein, a flow responsive switch is provided for turning on the electrical heating circuit to generate substantially instantaneous heating of the fluid as it begins to flow from the open tap.

Alternatively, heating devices constructed in accordance with the present invention may be utilized in a variety of heating installations and systems. For example, the heating apparatus can be utilized for maintaining the temperature of a recirculating industrial liquid bath or the like, so long as the liquid exhibits the necessary electrical resistivity. The device is particularly advantageous for installations in which space is at a premium, such as in mobile homes, travel trailers, hotels and motels, saunas, pools, etc. In some cases, it is extremely useful to have a portable, water heating apparatus operable from a source of electrical energy and in such case a device constructed in accordance with the present invention is particularly suited for this use. In general, systems and devices constructed and operating in accordance with the present invention are useful in any installation where such features as small size and compactness, inexhaustibility of the supply of hot water or other liquid, efficiency to converting electrical energy into heated water, portability, no less or consumption of energy when not in use and elimination of costly reheating of water as required in conventional hot water storage systems, are desirable.

In addition to these characteristics, hot water heaters operating in accordance with this type of apparatus also eliminate liming or scaling on the interior surfaces of pipes caused by temperature cycling of water in the plumbing system between the hot water storage tank and the water taps, eliminates wasteful energy loss from the repeated heating and cooling of water and pipes between the storage tank and water outlet, provides in some cases a germicidal cleansing of water by killing certain bacteria because of the high intensity electric field and current flow as the water passes between the closely spaced electrodes and provides a viable alternative to the increasing consumption of a disappearing natural resource, namely natural gas, by efficiently using electrical energy.

With particular reference to FIG. 2, the operation of apparatus 10 is initiated by a flow of water or other liquid into inlet conduit 12. After circulating through a water cooled heat sink assembly 21, the purpose of which is described more fully hereinafter, the pressure of the inflowing water operates a flow switch assembly 22 which serves as a means for sensing the commencement of flow of the liquid in response to the opening of a water tap or other liquid flow valve at a location either upstream or downstream from the apparatus. Flow switch assembly 22 in this instance is an electromechanical means which operates in response to an increase in water pressure on one side of a spring biased plunger which serves the twofold function of actuating the main power electrical switch which turns on the electrical control circuit and begins supplying electrical energy to the electrodes 17 and 18 and also opens to allow the flow of water through an inlet port 23 which communicates with the annular conical flow channel 16 defined by the electrodes. The fluid now passes up through channel 16 from the small ends of electrodes 17 and 18 and exits as the large end of the electrodes.

Concurrently with the initiation of fluid flow up through channel 16, the electrical control circuit as described herein is turned on by the control switch 24 in response to assembly 22. The particular manner in which the electrical energy is applied to the electrodes and thereafter controlled constitutes a significant feature of the present invention and is described in greater detail herein below. Briefly, however, the electrodes 17 and 18 which are preferably made of a noncorrosive, inert, electrically conductive material such as graphite are connected across an alternating current source such that a substantial, alternating voltage polarity is developed across the gap defined by channel 16 between the electrodes. As the undistilled water or other resistive liquid flows through the channel, the voltage difference produces a current flow substantially directly between the confronting electrode surfaces. The amount of current flow is a function of the voltage, distance and resistance of the liquid between the electrodes. Under proper conditions, sufficient current flow is established through the liquid which in conjunction with the resistive or real dissipative impedance thereof produces sufficient energy or wattage loss in the liquid. This energy or wattage loss appears in the form of heat or temperature rise in the water.

Another advantage lies in the fact that the water assumes the same temperature as the surface of the electrodes 17 and 18. There is no temperature gradient in the electrodes adjacent at the surfaces thereof as in the case of a CALROD (TM) element used in a conventional storage heater. This fact together with the constant flow of the liquid adjacent electrodes 17 and 18 prevents the buildup of scaling and lime deposits which limit the useful lifetime of conventional heaters.

The heated water thus flows out of the upper and larger end of conical channel 16 and from there out through a lateral discharge port 26 and hence into outlet conduit 14. At a suitable location adjacent the discharge end of conical shaped flow channel 16, a solid state temperature sensing probe device 27, such as a thermistoc as used in the present embodiment, is placed for monitoring the temperature of the heated liquid. Here, device 27 is mounted in coupling 29 and includes an elongate heat conductive probe 30 around which the heated liquid circulates. This temperature monitoring serves as an input to the electrical control circuit for ensuring proper electrical energization of electrodes 17 and 18 to maintain a desired, preselected temperature.

As described more fully herein, apparatus 10 further includes an exteriorly accessible, manually adjustable control 31 serving as a means for adjusting the spacing between electrodes 17 and 18. The relative positions of the electrodes are adjustable to increase or decrease the transverse gap dimension across flow channel 16 for matching the apparatus 10 to a particular fluid conductivity. For example, given the conductivity of water in a particularly locale, control 31 may be adjusted for desired heating capacity in BTUs per hour, maximum temperature rise for a given flow rate, and/or maximum permissible current flow. Similarly, the temperature of the outflowing liquid may be selected, within a maximum temperature limit, by an exteriorly accessible manual temperature control 32. Electrode spacing control 31 may thus be adjusted for a given conductivity and maximum temperature level within the power limitations, namely current flow at the available voltage level, and thereafter control 32 may be adjusted to a desired temperature level limited by the maximum level established by control 31 and the available electrical power.

With reference to FIG. 3, an important feature of the present invention is the provision of an electrical control circuit 36 which is capable among other things of automatically adjusting or compensating for varying conductivities of the heated liquid. It has long been known in this art that the conductivity of liquids, in particularly tap water, varies from time to time and from community to community. Without safeguards, a sudden increase in conductivity of the water can cause excessive power flow to the electrodes and undesired and unexpected high temperatures and even boiling of the water. These hazards are precluded in apparatus 10 by electrical control circuit 36.

Circuit 36 which may be conveniently mounted within a control box or compartment 37 within housing 11 is adapted to be connected to a source of line voltage 13 which may be as in this instance a single phase, three wire, 220 – 240 volts 40 – 400 cycle alternating current source. As described more fully hereinafter, various alternating current sources may be utilized in the preferred embodiment of the present invention, however for most installations at least single phase 220 – 240 volts ac is required in order to develop sufficient power of typical residential and industrial hot water requirements. The source of line voltage 13 may be connected as shown to terminals 38 and 39 and a ground terminal 41. These terminal means may be disposed on a separate terminal board 42 mounted as shown in FIG. 2 within housing 11.

An indicator light 35 may be provided in circuit 36 and mounted on housing 11 as shown in FIGS. 1 and 3 for indicating that the device has been actuated by flowing fluid an is in a heating mode.

A triggerable alternating current switching means, here including a triac 43, is connected to the terminal means and, in particular, across terminals 38 and 39 and to electrodes 17 and 18 via terminals 40 and 45 as shown in FIG. 3 for selectively applying the ac source current to electrodes 17 and 18. As the electrodes 17 and 18 become oppositely charged by the magnitude of the alternating voltage available at terminals 38 and 39, current will pass through the resistance of the liquid, transverse to the flow of the liquid through channel 16.

In addition to triac 43, an triggerable alternating current switching means includes a zero crossover detector and pulse shaper 44 to serve as a means for detecting the zero crossing of the alternating current wave form applied across triac 43 and for producing a train of electrical pulses, each centered on the zero crossing. This train of pulses is developed at an output 46 of detector and pulse shaper circuit 44 and is selectively transmitted through a logic circuit 47, the purpose of which is described herein, to a drive or trigger circuit 48 for triac 43. In a manner more fully described herein, triac 43 is operated by circuits 44 and 48 to assume its conducting or "on" condition for passing half or full cycles of alternating current to electrodes 17 and 18.

To achieve instantaneous heating of the flowing liquid together with reliable operation under conditions of varying conductivity of the liquid, circuit 36 includes the combination of a current sensing and limiting circuit 51 and a temperature sensing and comparing circuit 52. The outputs of both the current and temperature controlling circuits are cooperatively combined through logic circuit 47 to cause triac 43 to be switched between its on and off conditions intermittently to produce fast, efficient and safe heating of the liquid by electrodes 17 and 18. Temperature sensing and comparing circuit 52 includes an adjustable means for setting a preselected output temperature of the heated liquid, while current sensing and limiting circuit 51 includes adjustable means for setting the maximum allowable current flow to the electrodes 17 and 18. Only under the proper combination of operating conditions of circuits 51 and 52 and only at the appropriate times determined by circuit 44 will triac 43 be switched to its conducting state.

Supply voltage for operating the various networks of circuit 36 is provided by a power supply circuit 53 which develops a dc B+ to B− supply voltage as indicated across terminals 54 and 56, respectively. Circuit 53 derives its electrical power from the line voltage available across terminals 38 and 39 through a supply transformer 57, with diode 58 connected across the secondary 59 of transformer 57 and serving as a half wave rectifier. A zener diode 61 establishes a reference voltage in conjunction with transistor 62 and collector resistor 63 and resistor 60 with capacitors 64, 65, 66 and 67 serving as electrical filters.

Circuit 36 may be provided as in the present embodiment with a momentary time delay to allow the contacts of flow switch 24 to completely close before switching triac 43 to allow current flow to electrodes 17 and 18. Here, this momentary time delay is provided by appropriate selection of the time constants associated with the various capacitors and resistive impedances of power supply circuit 53 and a reference signal circuit 94 to delay the build up of voltage across terminals 54 and 56 and momentarily maintain comparator circuit 91 off during charging of circuit 94.

The construction and operation of current sensing and limiting circuit 51 may be provided in the following manner. In this embodiment, a current sensing resistor 71 is connected as illustrated in series with electrodes 17 and 18 through terminals 40 and 45. When triac 43 is switched "on", the instantaneous current flow through the resistive liquid is registered by a voltage drop across sensing resistor 71, proportional to the magnitude of alternating current flowing to and from the electrodes. This sensed alternating current signal is passes through a transformer 72 and thereupon rectified by a full wave diode rectifying bridge network 73 to develop a dc voltage which is proportional to the peak current flow through the liquid.

This current sense signal is passed to an integrating circuit 76 through an isolation circuit 77 and integrated to establish a variable direct current signal which is thereupon compared with a preselected direct current reference signal. More particularly, the isolation circuit 77 is provided by a transistor 78 connected to an emitter follower configuration with resistor 79. Integrator circuit 76 is provided by diode 81, capacitor 82, transistor 83, resistors 84, 85 and 86, and adjustable resistor 87 as shown. Resistor 87 adjusts the discharge time constant of circuit 76.

A comparator 91 including feedback resistor 92 is connected with one of its inputs responsive through resistor 93 to integrator 76 and with its remaining input connected to a reference voltage set by adjustable reference voltage circuit 94 including potentiometer 96, resistors 97 and 98 and capacitor 99.

In operation, capacitor 82 of integrator 76 charges to a peak voltage proportional to the peak ripple voltage appearing across resistor 74. After establishing the peak voltage across capacitor 82, diode 81 becomes reverse biased when the dc voltage across the capacitor is larger than the signal passed by isolation transistor 78.

Transistor 83 of integrator 76 establishes a constant current discharge path for the voltage build up on capacitor 82. Resistors 85 and 86 provide a fixed direct current bias for transistor 83 and also establish the voltage drop across emitter resistors 84 and 87. Resistor 87 allows for adjusting the discharge current from capacitor 82 through transistor 83.

Figure 5:
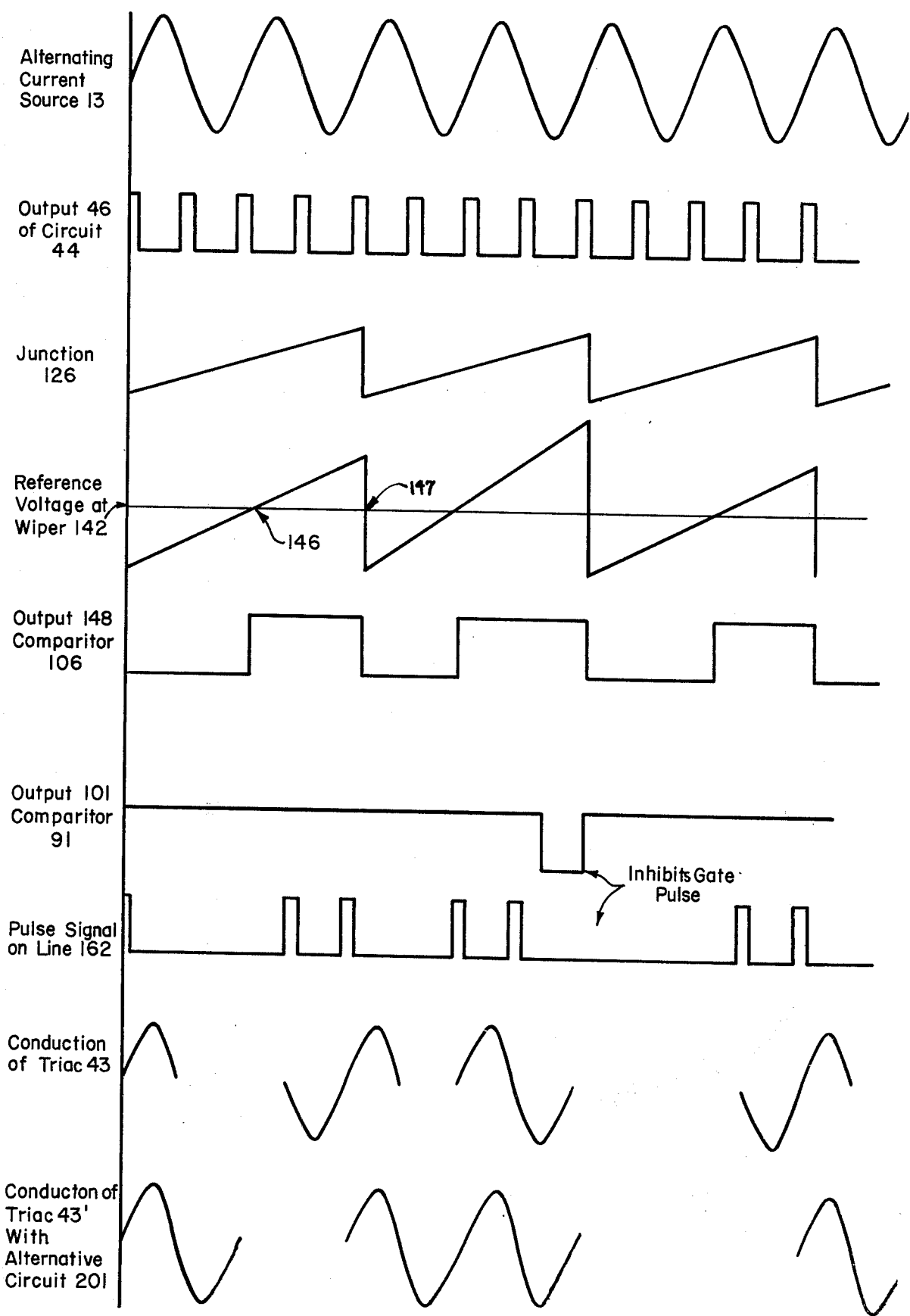
FIG. 5 is a multi-part graph drawn to the same horizontal time scale and showing the wave forms of several electric signals present in the control circuit of FIG. 3.

Output 101 of comparator 91 has two discrete levels and assumes one of these levels in response to the relative magnitudes of the integrated signal across capacitor 82 and the reference voltage developed on wiper arm 102 of potentiometer 96 of circuit 94. With reference to FIG. 5, this two level nature of the signal at output 101 of comparator 91 is illustrated. The comparator output in this instance is normally "high" corresponding to the condition in which the current charge on capacitor 82 is less than the reference voltage set by circuit 94. When the current flowing to and from electrodes 17 and 18 exceeds the reference level set by circuit 94, the voltage on capacitor 82 exceeds the reference voltage and comparator 91 switches to its "low" level at output 101. In the low level condition, the output of comparator 91 conditions logic circuit 47 to block the train of trigger pulses from reaching trigger circuit 48, thus inhibiting the switching of triac 43 to its conducting state. This, of course, terminates the current flow to the heating electrodes and allows the average current level to subside below a level set by reference circuit 94.

Variable resistor 87 may be adjusted to vary the discharge current for capacitor 82 and thus vary the time constant, namely responsiveness, of the current sensing and limiting circuit to variations in the average electrode current flow.

Accordingly, it will be seen that circuit 51 serves as a means for first sensing the current flow through the resistive liquid and secondly as a means for limiting such current flow to a predetermined maximum level. In the event of a decrease in the resistivity of the liquid, such as caused by an increase in the impurities in ordinary tap water, circuit 51 automatically prevents the temperature of the liquid from becoming excessive by reason of otherwise uncontrolled increases in current flow and power dissipation in the liquid.

The temperature sensing and control performed by circuit 52 must be capable of rapidly increasing the liquid from ambient temperature to a selected high temperature level. Moreover, this rapid temperature response must be achieved without incurring instability in the feedback loop. This is achieved in the preferred embodiment of the present invention by a circuit 52 which includes a relatively high gain feedback loop with a special temperature comparison circuit which permits a high forward gain without sacrificing stability. More particularly, circuit 52 employs a comparator 106 having the inputs thereof responsive to a ramp or slope crossover circuit indicated at 107.

Circuit 107 includes an oscillator 108 having a period significantly greater than the period or wavelength of the applied input line voltage available at source 13. In this instance, oscillator 108 is a unijunction oscillator formed by unijunction transistor 109, resistor 111, capacitor 112 and resistor 113. A constant current circuit for the unijunction oscillator is provided by transistor 114, resistors 116 and 117, resistor 118 and variable resistor 119, the latter of which adjusts the available current for the unijunction oscillator and thus determines the frequency and period of operation therefor.

The oscillator is synchronized to the zero crossover pulses developed by circuit 44 by means of transistor 121 and resistor 122 connected to output 46 of circuit 44 and resistor 123 and capacitor 124, the latter of which is connected in circuit with unijunction transistor 109 to provide the following synchronization.

Transistor 121 receives the zero crossover pulses from the output 46 of circuit 44 and as capacitor 112 of the oscillator charges up to the firing point of the oscillator, capacitor 124 differentiates the leading and trailing edge of the zero crossover pulse. The differentiated pulse is coupled by capacitor 124 to unijunction transistor 109 to cause the oscillator to fire in synchronization and in this instance with the negative edge of the zero crossover pulse signal. For reasons more fully appreciated herein, this feature ensures that the period of the oscillator in inphase with the zero crossover pulses produced by circuit 44.

This operation produces a sawtooth wave form illustrated in FIG. 5 at junction 126 of oscillator 108. It is observed that the sawtooth wave form has a period which significantly exceeds that of the applied input frequency source and is in synchronization with the zero crossover pulses produced by circuit 44.

The resultant sawtooth is applied to a transistor emitter follower circuit including transistor 127, resistor 128, thermistor 129 serving as the temperature sensing device 27 in FIG. 2, resistor 131 and compensating capacitors 132 and 133. Thermistor 129 and resistor 131 are connected in series in the emitter circuit of transistor 127 to serve as a temperature sensitive voltage divider for the sawtooth signal developed by oscillator 108. More particularly, the sawtooth signal is applied across this voltage divider circuit resulting in a variable amplitude ramp signal modulated by the temperature of the outflowing liquid and thus by the resistance of thermistor 129.

The variable amplitude ramp or sawtooth signal developed by this circuit is applied to one input of comparator 106 via junction 134. The other input of comparator 106 receives a reference temperature signal developed by reference circuit 137 and including resistors 138 and 139 and potentiometer 141 and input resistor 126 and feedback resistor 140. The wiper arm 142 of potentiometer 141 may be adjusted to select a desired temperature level in the form of a reference direct current voltage which is compared in comparator 106 with the variable amplitude sawtooth signal appearing at junction 134 as illustrated by the superimposed reference and variable amplitude sawtooth wave forms in FIG. 5.

In this instance, thermistor 129 has a negative temperature coefficient and the voltage applied to comparator 106 is developed across thermistor 129 in series with resistor 131. Accordingly, the voltage cross thermistor 129 decreases when the temperature of the outflowing water or other liquid increases. With reference to the superimposed wave forms in FIG. 5, comparator 106 sense whether or not the sawtooth voltage wave from across resistor 131 exceeds the preestablished reference voltage at wiper arm 142. When the temperature of the outflowing liquid is low, such as upon commencement of the flow of water through the system, there is a maximum amplitude of the sawtooth signal across thermistor 129 and the sawtooth signal lies above the reference voltage and the output of comparator 106 is maintained at its "high" level. However, as the temperature of the outflowing liquid increases to the preselected temperature, comparator 106 senses a crossover point, for example crossover 146 in FIG. 5 and in response thereto switches to its "low" discrete state and remains there until the sawtooth wave form decreases below the reference level as indicated by crossover point 146 of FIG. 5. The second crossover point, for example point 147, corresponds to the negative going edge of the sawtooth wave form.

The resulting signal at an output 148 of comparator 106 is also illustrated in FIG. 5 wherein it is observed that the "low" going portions of the wave form correspond to the crossover points of the variable amplitude signal at junction 134 with the reference voltage at wiper arm 142.

In this particular embodiment, the normally "high" state at output 148 of comparator 106 conditions logic circuit 47 to pass the train of zero crossover pulses to and for triggering triac 43 by means of circuit 48. On the other hand when the output 148 goes "low", logic circuit 47 is inhibited by this output from the temperature circuit 52 and the train of triggering pulses is temporarily blocked.

By using a period for the sawtooth wave form developed at junction 134 as determined by the period of oscillation of oscillator 108 to be greater than the period of the frequency of the source signal and by using the variable amplitude ramp crossover technique for completing the thermal feedback loop, an exceedingly high grain feedback loop may be employed for the temperature circuit 52. The longer period of the sawtooth wave from eliminates any interference from stray 60 cycle or other frequency residuals originating from source 13. The ramp crossover provides a positive, stable detection of the error or difference signal between the desired temperature set by circuit 137 and the actual temperature of the liquid is measured by thermistor 129. Even with a high gain in the thermal loop, the temperature rises rapidly and approaches the preselected temperature without being susceptible to overshooting or other instability. Furthermore, the period of the variable amplitude sawtooth wave form is selected to be less than the thermal time constant of the system so that circuit 52 is able to rapidly respond to temperature changes at the heater output.

Zero crossover detector and pulse shaper circuit 44 is provided in this instance by a commercially available integrated circuit zero crossover detector 151. In this instance, detector 151 may be purchased from RCA under Part No. CA3079 and connected with biasing resistors 152 and 153, filter capacitor 154 and output resistor 156 is shown. Detector 151 is responsive to the alternating current signal, in this instance derived from the secondary 59 of transformer 57 via connecting lines 157 and 158, including dropping resistor 159 connected in series with line 158. The resulting output pulse train available at output 46 is shown in FIG. 5 and includes a train of pulses of predetermined height and width centered about the zero crossover of the alternating current source signal applied at terminals 38 and 39.

With current sensing an limiting circuit 36 in its normally "high" state and with temperature sensing and comparing circuit 52 also in its normally "high" state, logic circuit 47 passes the train of pulses from output 46 of circuit 44 over connecting line 161 to connecting line 162 through circuit 47 for operating trigger circuit 48. In this instance, trigger circuit 48 includes a transistor 163 having its emitter connected through a resistor 164 to B+ and having its collector connected in series with the primary of a transformer 166, the secondary of which 167 is connected to and for triggering triac 43. More particularly, secondary 167 is connected across the gate 168 and a first main terminal 169 of the triac.

In response to each zero crossing pulse received at circuit 48 from logic circuit 47, transistor 163 switches state to cause a trigger signal to be passed by transformer 166 to gate 168 of the triac. After initiating conduction in triac 43, alternating current is passed from terminal 38 through a radio frequency choke 172, flow switch 24 which has been previously closed upon the commencement of flow of the liquid, through current sensing resistor 71 to terminal 40 and through the flowing liquid via electrodes 17 and 18 to terminal 45 and from there through triac 43 to the return line terminal 39 of source 13. A serially connected RC network including capacitor 173 and resistor 174 may be connected between terminal 39 and second main terminal 171 of triac 43 for suppressing undesirable electrical transients.

Logic circuit 47 is provided with three inputs 181, 182 and 183 connected to temperature sensing and comparing circuit 52, current sensing and limiting circuit 51 and zero crossover detector circuit 44, respectively. Its function is to monitor the output condition of circuits 51 and 52 and selectively inhibit the transmission of the zero crossover triggering pulses to circuit 48 and triac 43 depending upon the current and temperature conditions of the system. In particular, input 182 to logic circuit 47 inhibits the triggering of triac 43 in the event the current flow to and from electrodes 17 and 18 exceeds a preselected maximum current set by potentiometer 96 of circuit 94. Similarly, input 181 is responsive to the output of circuit 52 for inhibiting the triggering of triac 43 when the temperature sensed by device 27, here provided by thermistor 129, senses a temperature in excess of the preselected temperature set by reference circuit 137. Conversely, the operation of logic circuit may be described as providing for the continued retriggering of triac 43 via circuit 48 only during intervals in which the current sensing circuit senses a current flow below a preselected maximum current and at the same time the temperature sensing and comparing circuit senses a temperature of the heated liquid below and preselected reference temperature.

In this instance, circuit 47 is provided by a set of transistors 186, 187 and 188, and input resistors 189, 190, 191, 192, 193, and 194 connected as shown between inputs 181 – 183 and the base electrodes of each of transistors 186 – 188. The output of logic circuit 47 is available over line 162 as a voltage developed across resistor 166. In the present embodiment, transistors 186 through 188 and associated resistors form a three input AND gate in which the output therefrom on line 162 will result in a positive pulse for triggering triac 43 through transistor 163 and transformer 166 with the zero crossover pulses from circuit 44 when there is no excessive current detected by circuit 51 and when the temperature of the outlet fluid lies below the preselected temperature level.

It is observed that the triggerable alternating current switching means in the form of circuit 44, circuit 48 and triac 43 operate in combination with circuits 51 and 52 and logic circuit 47 to first continuously retrigger triac 43 with the zero crossing pulses until the temperature of the outflowing liquid reaches the desired temperature level, or until the current flow to and from the electrodes exceeds the permissible maximum current level, and thereafter to intermittently trigger triac 43 by selective interruption of the pulse train to maintain the desired temperature level of the outflowing fluid.

Moreover, it is observed that the intermittent operation of triac 43 is achieved in a manner which causes multiples of half or full cycles of the alternating current to be applied to the electrodes. For example, when the temperature has reached the preselected level, comparator 106 of circuit 52 periodically changes between its "high" and "low" output condition as shown in FIG. 5 to cause intermittent triggering of triac 43. Once triac 43 has been triggered to a conducting state, it will by its inherent nature continue to conduct for the succeeding half cycle. If it fails to be triggered on the succeeding half cycle by the next zero crossover, pulse, the conduction through the triac will terminate. Two successive zero crossing pulses are required as shown in FIG. 5 to achieve a full or complete cycle of alternating current flow to electrodes 17 and 18. It will be appreciated that control circuit 36 of the present invention functions to maintain the necessary or desired temperature level by injecting or adding quanta, half or full cycle multiples of the alternating current, to the electrodes 17 and 18.

This intermittent operation of the alternating current switching means, namely triac 43, together with the fact that the triac is switched on only adjacent the zero crossing of the alternating current source, provide an extremely efficient and reliable means for controlled electrical energization of the heating electrodes 17 and 18. Under typical conditions, the maximum or peak current flow through triac 43 and to and from electrodes 17 and 18 may be in the range of 60 to 200 amperes. It will be appreciated that any attempted swiching or other modulation of such large currents is not easily accomplished. The preferred embodiment of the present invention however easily handles these excessive currents by operating the triac 43 for intermittent conduction, with the turn on times being at or near the zero level of the alternating current voltage. During periods requiring maximum electrical energy to electrodes 17 and 18, triac 43 may be continuously retriggered to remain in its conducting state. When less electrical energy is required, such as to maintain the liquid temperature at the preselected level, only intermittent cycles of condition are demanded of triac 43. Maximum electrical energy consumption thus occurs during the time that the temperature of the inflowing liquid and the associated cool parts of the system are raised to a selected high temperature level. Thereafter, the power consumption decreases to a level sufficient only to maintain the desired temperature level of the outflowing water or other liquid.

Figure 4:
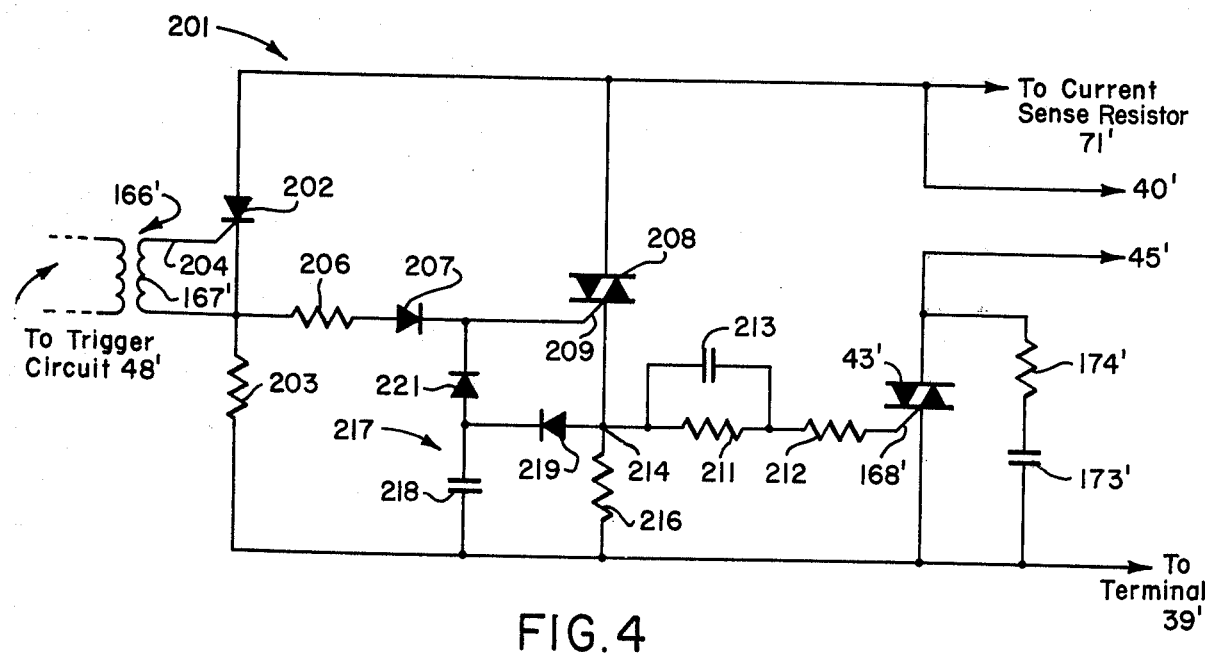
FIG. 4 is a schematic diagram of an optional circuit for use in combination with the control circuit of FIG. 3 in an alternative embodiment of the present invention.

With reference to FIG. 4, a alternative preferred triac switching circuit 201 is provided for supplementing the operation of triac 43 as it is shown in circuit 36 of FIG. 3. Triac 43 in circuit 36 of FIG. 3 as described above functions to continuously conduct for each half cycle of alternating current in response to each trigger pulse supplied from the zero crossover detector circuit 44. In response to a series of isolated single pulses, separated from each other by one or more pulses which have been blocked by logic circuit 47, triac 43 is triggered for only half cycle conduction. This half cycling of triac 43 provides satisfactory operation in terms of its ability to conduct sufficient quanta of electrical energy to and for energizing electrodes 17 and 18, however there is a disadvantage to this operation which is remedied by the alternative switching circuit 201 of FIG. 4.

In particular, the half cycling effect of triac 43 in circuit 36 of FIG. 3 can result in an unbalanced load on the source 13. For example, if a series of half cycles of the same polartiy are conducted by triac 43 from source 13, a direct current load component will appear on the line and possibly cause overheating of the utility companies power transformer. Circuit 201 of FIG. 4 is provided for eliminating this half cycling effect.

Circuit 201 may be connected to circuit 36 of FIG. 3 between transformer 166, current sense resistor 71 and terminal 39. With reference to FIG. 4, corresponding components of circuit 201 are designated by the same reference numeral as the corresponding part in circuit 36 of FIG. 3, however with a prime notation added. Thus in FIG. 4, the alternative switching circuit is connected between transformer 166', current sense resistor 71' and terminal 39'.

Circuit 201 functions to cause the triac 43' to conduct for a full cycle in response to any single trigger pulse received from trigger circuit 48'. Thus in using the alternative circuit of FIG. 4, the minimum or quanta amount of electrical energy applied to heater electrodes 17 and 18 consists of one full cycle of alternating current line voltage.

To achieve this result, circuit 201 in this instance is provided by an SCR 202 connected as shown current sense resistor 71' and terminal 39' in series with a resistor 203, with the gate electrode 204 of SCR 202 connected to the secondary 167' of transformer 166'. The trigger pulses from trigger circuit 48' trigger SCR 202 to a conducting state. However, because SCRs are capable of conduction in only one direction, only positive half cycles of the alternating current are conducted through SCR 202 when it is triggered by circuit 48'. During the negative half cycle of the ac wave form, SCR 202 does not conduct.

The positive cycle of conduction provided by SCR 202 is passed through a current limiting resistor 206 and a diode 207 to and for triggering an auxiliary triac 208 via its gate electrode 209. Triac 208 which has its main electrode terminals connected between current sense resistor 71' and terminal 39' thereupon conducts for the succeeding positive half cycle of alternating current voltage.

This positive half cycle of conduction of triac 208 applies a half cycle of positive voltage to a gate electrode 168' of triac 43' through a current limiting network including resistors 211 and 212 and a capacitor 213. This current limiting network is connected between a junction 214 and gate electrode 168' of triac 43' and the positive half cycle voltage is developed across a load resistor 216. This causes triac 43 to conduct for the first positive half cycle of the alternating current voltage passing through the liquid via terminals 40' and 45'.

To cause the triac 43' to conduct for the succeeding negative half cycle, a capacitive charging circuit 217 is provided. Circuit 217 includes a capacitor 218 which is charged by the voltage developed across resistor 216 via a diode 219. Capacitor 218 thus assumes the peak positive voltage developed across resistor 216 during the positive half cycle conduction of triac 208.

When the alternating current source swings negative, SCR 202 and triac 208 stop conducting. Similarly, triac 43 stops conducting, however immediately thereafter a trigger signal is automatically applied to the gate electrode 168' to continue the conduction of the triac through the succeeding negative half cycle. This is achieved in the following manner. The voltage charge on capacitor 218 from the positive half cycle conduction of triac 208 begins discharging when the alternating current swings negative. This discharge passes through diode 221 to gate 209 of triac 208 to trigger triac 208 as the alternating current swings into the negative half cycle. The negative half cycle conduction of triac 208 produces the necessary trigger signal for triggering gate 168' of triac 43' into conduction for completing the negative half cycle of applied ac voltage.

Accordingly, circuit 201 provides a circuit means for conditioning the triac 43' to conduct for a full cycle of alternating current voltage in response to a single trigger pulse signal from circit 48'.

With particular reference to FIG. 2, conical electrodes 17 and 18 and preferably mounted inside a hollow cylindrical housing including a main body part 226 which is threaded at opposite axial ends to receive upper and lower end parts 227 and 228, respectively, as shown including "O" ring seals 225 and 230. These parts are formed of a plastic or other insulating material to minimize the electrode to ground leakage impedance which has posed a problem in many prior art devices because of the conductivity of the water. By using insulator parts, such as parts 226 – 228 surrounding the electrodes, the resistive path through the water to a ground point, such as housing 11, is sufficiently remote to reduce the ground leakage current to a negligible amount.

The outer conical electrode 18 is disposed inside part 226 with the exterior wall of electrode 18 closely fitting to the interior wall of art 226 as shown with a transversely extending electrode terminal assembly 229 electrically and mechanically extending transversely through the wall of part 226 between electrode 18 and the exterior of hollow cylindrical part 226. Assembly 229 thus serves as schematic terminal 40 of circuit 36 as shown in FIG. 3. Electrode 18 may be cut away adjacent the exterior wall thereof as indicated at 231 to reduce the thermal inertia or capacity thereof which in turns decreases the overall thermal time constant of the apparatus.

Inner conical electrode 17 is mounted adjacent its upper and larger end 232 to a cam follower part 233 formed of plastic or other insulating material by suitable fastening means such as screw fasteners 234. Part 233 has a generally cylindrical configuration an is axially aligned with conical electrode 17 and both parts are provided with an aligned bore 236 which extends completely through part 233 and terminates in this instance approximately midway through electrode 17. Part 233 and attached electrode 17 are slidably axially mounted on an elongate solid cylinder conductive post or part 237 which is fixedly, sealingly fastened to an end wall 238 of upper end cap or part 227. Conductive post 237 thus depends downwardly from part 227 in axial alignment with the various parts and serves to provide both an electrical and mechanical slidable mounting for the interior conical electrode 17. Electrical contact is achieved between post 237 and electrode 17 by the engagement of the outer surface of post 237 with the interior wall of bore 236 of the electrode. Electrical conduction and mechanical lubrication between these parts may be enhanced by applying an electrically conductive grease about post 237.

As previously discussed, the spacing between electrodes 17 and 18 may be conveniently and effectively adjusted by manual control 31. More particularly, this is achieved by an eccentric cam 241 eccentrically mounted to a control shaft 242, both of which are formed of a plastic or other insulating material with the opposite end of shaft 242 rotatable by control 31. Cam 241 cooperates with an annular groove 243 provided in cam follower part 233 such that rotation of control 31, shaft 242 and cam 241 results in axial displacement of inner conical electrode 17 with a resulting increase or decrease of the gap defined by conical flow channel 16.

Shaft 242 which extends laterally through housing cap or end piece 227 may be rotatably secured with respect thereto by assembly 244 including a seal for preventing leakage around shaft 242.

To facilitate axial movement of part 233 and electrode 17 on conductive post 237, an air escape slot 246 is formed longitudinally along the exterior of post 237 to permit the escape of air entrapped between the end of post 237 and the closed end of bore 236 in electrode 17.

Adjacent the small end of inner electrode 17, insulating spacer means are provided, here in the form of threaded plastic stock members 248 and 249. Members 248 and 249 are mounted inside mated threaded bores extending transversely through electrode 17 at axially spaced, but promimate, right angles to each other so that the ends of members 248 and 249 may abut the inside wall of electrode 18 to provide a minimum spacing of electrode 17 therefrom when electrode 17 is moved to its lowermost nested position.

By providing an exteriorly accessible manual control 31 for adjusting the electrode spacing, several significant advantages are achieved by the present apparatus. First, during installation of apparatus 10 as a water heating device, control 31 may be adjusted to match the apparatus to the particular conductivity of the water available at the installation. For a given maximum current load and maximum heating capacity in BTUs or other units, both of which factors will usually be established by the particular specifications of apparatus 10, control 31 may be set to the specific conductivity of the water. Moreover, control 31 maybe calibrated in terms of water conductivity, eg. micromhos, or in parts per million of impurities, and this calibration may be placed directly on apparatus 10 adjacent control 31. In such case, the installer merely is required to set control 31 to the particular dial setting corresponding to the known impurity level or conductivity of the liquid. Thereafter, the apparatus operates automatically in the manner previously described to adjust for temporary variations in the water conductivity. If the fluid conductivity incurs a permanent change in level, then the dial associated with control 31 need only be readjusted.

It is observed that the adjustment of the electrode spacing by control 31 is not used in the present apparatus for the purpose of controlling the temperature of the heated liquid. It merely enables the matching of the apparatus to the particular liquid to be heated. Control over the temperature of the water is achieved by manual control 32 which adjusts the reference voltage level set by circuit 137 in FIG. 3 by means of potentiometer 141. Once the temperature has been set by control 32, circuit 36 of FIG. 3 automatically applies the necessary electrical energy to the electrodes for causing the temperature of the outlet water to rise and remain at the selected level.

Figure 7:
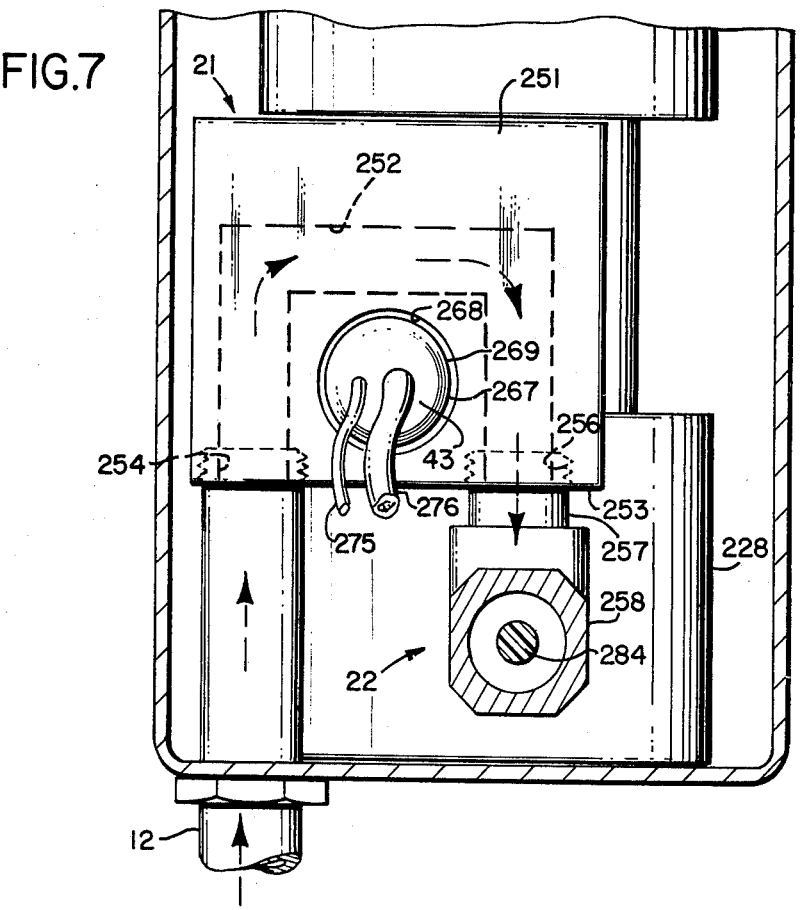
FIG. 7 is a section view taken generally from lines VII-VII of FIG. 2.

With reference to FIGS. 2 and 7, inflowing water or other liquid received via conduit 12 is initially used to circulate through a water cooled heat sink 21 for triac 43. Even though triac 43 is switched during the zero crossings of the alternating current source, nevertheless its conduction of very large peak currents may result in some heating of the device. To prevent overheating and to thus ensure long reliable life of triac 43, it is mounted in thermal communication with heat sink 21 which is preferably formed of a metal, such as aluminum. The heat sink includes a generally rectangular shaped body 251 having a U-shaped flow channel 252 entering and exiting the body from a lower surface 253 thereof at inlet port 254 and outlet port 256. Inlet port 254 is connected to inlet conduit 12 as best shown in FIG. 7 and outlet port 256 is connected by a connecting conduit 257 to a T coupling 258 of flow switch assembly 22.

Triac 43 is mounted to body 251 of heat sink 21 in this instance by means of a separate mounting place 261 which has substantially the same height and width dimensions as face 262 of body 251 for mounting the plate thereto. The triac is first secured to plate 261 through a mounting hole 263 which may be threadedly mated to the mounting stud 264 of triac 43. With triac 43 secured in this manner to plate 262, the plate is thereupon fastened to body 251 with an electrical insulating layer or gasket 266 sandwiched between the confronting surfaces of metal plate 261 and face 262 of metal body 251 to maintain complete electrical insulation between stud 264 which forms part of the electrical circuit of triac 43 and the metal body 251 of heat sink 21. To enhance the thermal heat conduction between plate 261 and body 251, thermally conductive grease may be applied to insulator 266 and the faces of plate 261 and body 251 which engage the insulator. The enlarged cylindrical body 267 of triac 43 is disposed inside a clearance opening 268 centrally located in body 251 as best shown in FIG. 7 and additional thermal conductive grease may be deposited in the annular space 269 between the triac body and the heat sink. Plate 261 may be secured to body 251 by a suitable fastening means such as indicated by screw fasteners 271 which are made of an insulating material such as plastic.

Electrical connection to stud 264 of triac 43 is provided by a connecting lug 272 which receives the connection of electrical leads 273 and 274. Lead 273 connects the triac to terminal assembly 229 corresponding to terminal 45 in circuit 36 of FIG. 3. Lead 274 on the other hand extends to the electrical control compartment 37 for connection to resistor 174, also shown in FIG. 3.

The other main terminal of triac 43 corresponding to terminal 169 in FIG. 3 is provided by an elongate lead 275 which protrudes from triac 43 opposite from stud 264. Lead 276 is extended to and for connection to terminal 39 for receiving one lead of the source 13. Similarly, the gate electrode corresponding to electrode 168 in FIG. 3 is provided by an elongate wire lead 275 extending from the same side of triac 43 as lead 275. Gate electrode lead 275 is extended to compartment 37 for connection to transformer 166 as shown in the schematic of FIG. 3.

The inflowing liquid at ambient temperature circulates through passage 252 of heat sink 21 and is discharged at port 256 into coupling 258 of flow switch assembly 22. Flow switch assembly 22 is provided with stable on and off pressure responsive positions. When the flow of liquid is initiated by opening a line valve upstream or downstream of apparatus 10, the build up of water or other liquid pressure on the limited exposed annular portion 281 of piston 282 forces the piston 282 away from coupling 258 against a biasing force provided by spring 283. An "O" ring seal 280 on piton 282 prevents the liquid from blowing by the outer circumference of the piston.

An elongate system portion 284 extending from one axial end of piston 282 is thereby displaced along with the piston to trip a switch actuator or lever 286 of flow switch 24. Simultaneously, another stem portion 287 of piston 282 opposite portion 284 and in axial alignment therewith is displaced further into an axially aligned bore 288 for guiding portion 287 and provided by a guide bore assembly 289. Assembly 289 also serves to seal an end of opening 291 of bore 292 in which piston 282 reciprocates. In this instance, bore 292 for the reciprocating piston 281 is formed directly inside a lower portion of end cap part 228 of the electrode housing. This is also illustrated in FIG. 7.

Thus, when the inlet pressure on annular portion 281 of piston 282 exceeds the bias force of spring 283, piston 282 together with its stem portions is displaced to actuate the flow switch 24.

When this occurs, piston 282 is displaced away from an annular shoulder 293 which had heretofore limited the effective pressure on piston 282 to annular region 281. Once the piston is displaced away from shoulder 293, a larger surface area is exposed for responding to the liquid pressure within coupling 258 and the piston is immediately, positively displaced against the spring bias, tripping switch 24. A bypass port 295 is provided between bore 292 and the interior chamber of the electrode housing remote from port 23 to prevent entrapment of liquid pressure by piston 282 at the rear of bore 292.

In addition to operating switch 24 for applying electrical energy to the electrodes 17 and 18, flow switch assembly also functions as a threshold pressure valve by requiring sufficient inlet fluid pressure to displace piston 282 before the inlet fluid is allowed to enter the electrode housing through port 23. In other words, piston 282 must be actuated in the above-mentioned manner and fully displaced against biasing spring 283 to allow the fluid from coupling 258 to pass through port 23 and from there into the flow channel 16 between the electrodes.

As a safety, a standard pressure actuated pressure relief valve may be connected to a port 296 which communicates with port 23 and bore 292 adjacent piston 282 for relieving an excessive pressure building within the unit. Alternatively, the pressure relief value may be mounted downstream of the unit adjacent outlet conduit 14.

Also as a further safety feature of this embodiment of the present invention, flow switch 24 may be an overload breaker switch. In this manner, switch 24 serves the dual purposes of turning the electrical system on and off in response to assembly 22 and interrupting the electrical power to the unit in the event of a current overload. As shown in FIG. 3, the switch 24 is disposed in series with terminal 38 so that it may be opened to completely interrupt the electrical power to the circuitry of the unit. By adapting a standard breaker witch for this purpose, the switch may be reset by turning the water or other liquid pressure on and off so that piston 282 and stem portion 284 are displaced through a complete cycle to reset the breaker switch by actuator lever 286.

A linkage means 285 between stem portion 284 and breaker switch lever 286 may be provided with limited freedom or slopage, here by means of a spool shaped member 290 mounted on stem portion 284 and having spaced apart enlarged end portions for tripping lever 286 "on" and "off" and yet permitting the breaker mechanism to operate automatically without mechanical restraint.

With reference to FIGS. 2 and 3, the electrical circuit from breaker switch 24 extends from terminal 38 and radio frequency choke 172 through switch 24 to a junction 297. At junction 297, ac power is derived for transformers 57 and 72 and for indicator light 35, and the bulk of the electrical current passes through current sensing resistor 71 to terminal 40 for connection to electrode 17. In FIG. 2, this electrical connection is provided by lead 298 extending from compartment 37 to a lug terminal 299 secured to an upper threaded end 301 of post 237 protruding from end 238 of housing part 227 with a fastener 302.

With apparatus 10 constructed in accordance with the foregoing description, the water or other resistive liquid enters the lower and smaller end of conically shaped electrodes 17 and 18 and is heated by the dissipation of electrical energy directly within the liquid as it passes up through channel 16. It has been found that the best operation of the unit is achieved by directing the flow of water in through the small end of electrodes 17 and 18 with the discharge being as shown out the larger upper end of the electrodes. With this direction of flow, the water is believed to undergo an incremental heating effect in which the amount of heat dissipation into the water increases from the inlet to the outlet of flow channel 16. That is, the resistance presented to the electrodes by the water is greatest adjacent the small end of the electrode cones and decreases as the cross section of the cones become larger and the volume of the water within any given incremental cross section of channel 16 increases. Thus, it might be said that the heating of the cold water begins gradually and accelerates as the water approaches the discharge end of channel 16.

Another preferred operating characteristic is the mounting of the conical shaped electrodes 17 and 18 so that the axes thereof are vertically oriented and the connecting of the inlet liquid or water so that it enters flow channel 16 from the lower end. By this arrangement, the water uniformally builds up and is forced by its own increasing volume up into flow channel 16 and out through discharge port 26. Similarly, when the flow is terminated, the water level gradually subsides uniformally down through channel 16 and out through port 23. In other words, the liquid responds to the forces of gravity to provide a uniform filling an draining of the space between the electrodes without leaving residual drops of water. With other orientations, it has been found that water droplets occur which enter the flow channel 16 and are immediately converted to steam which may significantly interfere with the operation of the apparatus, at least where it is intended for use as a water heater. The formation of excessive amounts of steam within the electrode housing and adjacent conduits may cause a vapor lock which blocks the flow of inlet water and disables the apparatus.

Apparatus 10 constructed in accordance with the foregoing disclosure is a truly proportional electrical heater. That is, only enough electrical current is drawn by the device in order to heat and maintain the liquid at the preselected temperature. There is no wasted electrical energy such as caused by periodic overheating to maintain an average temperature as in the case of the conventional Calrod (TM) storage heater. The conventional heater maintains the water at the selected temperature by periodically turning the electric Calrod (TM) element on at full power and allowing the water temperature to rise to above the selected level and thereafter turning the electrical current off in a "bang-bang" manner. Such is an inefficient system. In contrast, the apparatus 10 uses only the current necessary for rapidly raising the temperature and decreases the add current by supplying fewer quanta of half or full cycle ac pulses to the electrodes as the temperature of the water approaches the desired range. The current or electrical energy added is closely proportional at all times to the required thermal energy needed.

Figure 6:
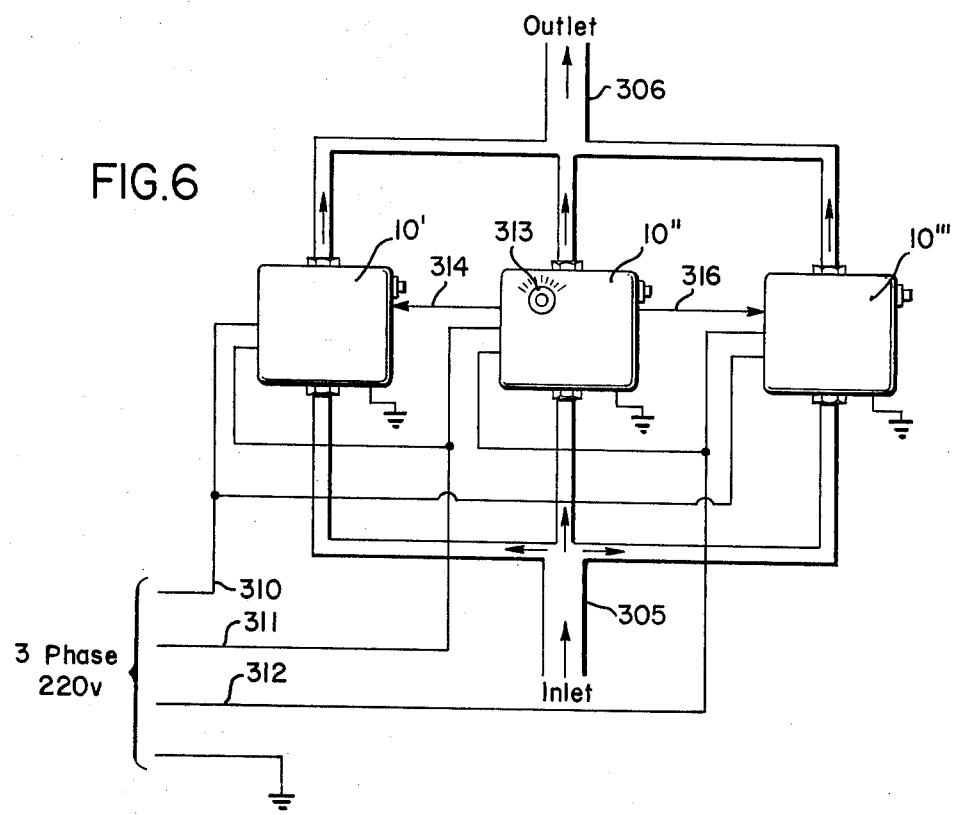
FIG. 6 is an electrical-mechanical schematic diagram illustrating one of several alternative arrangements for combining a plurality of devices of the type shown in FIG. 1 for increasing the capacity of the heating system.

While the electrical connection to the apparatus shown in FIG. 6 is intended for a single phase three wire 220 – 240 system, FIG. 6 of the drawings illustrates how three heating units may be connected for simultaneous operation from a three phase four wire 220 – 240 volt source.

In this instance and as shown in FIG. 6, the units are connected in a parallel water or liquid flow network in which a common inlet conduit 305 divides into three branches each equipped with a heating apparatus 10′, 10″ and 10‴, each generally corresponding to unit 10 of FIG. 1. After each channel is heated by the associated apparatus, the flow branches are combined into a common outlet conduit 306.

The advantage of this system over a single apparatus 10 designed for the higher flow capacity and heating requirements of a larger water system is the ability to operate three units in combination from a three phase 220 – 240 power system. In a three phase system, the 220 – 240 voltage appears between the first and second line, second and third and third and first line such that the units 10′, 10″ and 10‴ may be connected as shown for joint operation. In particular, apparatus 10′ is connected to operate off the voltage between lines 310 and 311, unit 10″ from the voltage between lines 311 and 312, and apparatus 10‴ from the voltage between lines 312 and 310. A single temperature control 313 may be provided by a single manual control corresponding to control 32 of unit 10 in FIG. 1 with potentiometer 141 as shown in FIG. 3 for circuit 36 replaced by a tandem, three deck potentiometer, one deck for each of units 10′, 10″ and 10‴. The electrical connections between the three deck potentiometer mounted in this instance on unit 10‴ to each of units 10′ and 10‴ are indicated by connections 314 and 316.

In this manner, a tremendously increased heating capacity is achieved in a balanced three phase system. It has the advantage of being able to draw substantially greater power without unbalancing the power companies output transformer which are designed for balanced three phase operation.

Although FIG. 6 illustrates a three unit, parallel flow, three phase electrical system, it is also possible to provide where desired the serial connection of a plurality of three heating units. In such as case, three units corresponding to apparatuses 10′, 10″ and 10‴ may be connected with their inlets and outlets in a serial flow path such that each unit increases the temperature by a selected incremental amount. The total increase in temperature of the flowing liquid would be measured from the inlet of the first unit to the outlet of the third or last unit.

Again, the system may be connected to take advantage of a three phase electrical supply in which case the units would have the same or similar electrical connection as shown in FIG. 6.

While only a limited number of embodiments of the present invention have been disclosed herein, it will be readily apparent to persons skilled in the art that numerous changes and modifications may be made thereto without departing from the spirit of the invention. Accordingly, the foregoing disclosure an description thereof are for illustrative purposes only and do not in any way limit the invention which is defined only by the following claims.

I claim:

1. Apparatus for controlled heating of a flowing liquid capable of conducting electrical current, comprising:
    at least one pair of spaced electrodes disposed to contact said flowing liquid for passing an electrical current therethrough;
    terminal means adapted for connection to a source of alternating current;
    triggerable alternating current switching means connected to said terminal means and to said electrodes for selectively connecting said alternating current to said electrodes for passing said electrical current through said liquid;
    current sensing means for sensing the magnitude of current flow between said electrodes through said liquid;
    temperature sensing and comparing means for sensing the temperature of said liquid after being heated by said current flow and electrically comparing said temperature with a preselected reference temperature; and
    logic circuit means having inputs connected to said current sensing means and to said temperature sensing and comparing means and having an output connected to and for controlling said switching means for conditioning said switching means to pass said alternating current to said electrodes only during intervals when said current sensing means senses a current flow below a preselected maximum current and concurrently therewith said temperature sensing and comparing means senses a temperature of said liquid below said preselected reference temperature, whereby an alternating current is passed through the flowing liquid causing a rapid increase in temperature thereof until said preselected reference temperature is attained whereafter said alternating current is applied intermittently to maintain said preselected reference temperature unless excessive current flow is encountered by reason of increased conductivity of said liquid whereupon said current flow is limited to said maximum current level with a concomitant decrease in the temperature level of the liquid below said preselected reference temperature,
    said triggerable alternating current switching means comprising:
    a solid state triac device connected in series with said electrodes;
    zero crossover detector means adapted for connection to said source of alternating current for issuing a train of electrical pulses representing in time the zero crossing of said alternating current; and
    trigger circuit means connected to said triac and to said logic circuit means for receiving said train of electrical pulses for triggering said triac to pass said alternating current to said electrodes for at least one half cycle of said alternating current following each such electrical pulse, whereby said triac is conditioned to pass a minimum quanta of electrical energy consisting of at least one half cycle of said alternating current in response to each pulse signal passed by said logic circuit means in accordance with the inputs thereto from said current sensing means and said temperature sensing and comparing means.

2. The apparatus of claim 1, wherein said current sensing means comprises:

impedance means connected in series with said electrodes for monitoring the current flow through said liquid;

rectifying means for rectifying a voltage developed across said impedance means in response to said current flow;

integrating means connected to said rectifying means for integrating the rectified signal produced thereby to produce an integrated signal proportional to the current flow to said electrodes and through said liquid; and comparator means and reference signal means for producing an electrical signal representing a desired maximum current flow through said liquid, said comparator means connected to said integrating means and reference signal means to compare said integrated signal with said reference signal to sense whether the current flow through said liquid exceeds said preselected maximum current.

3. The apparatus of claim 1, wherein said temperature sensing and comparing means comprises:

oscillator means;

ramp generator means connected and responsive to said oscillator means to produce a sawtooth signal having a period determined by said oscillator means;

temperature sensitive impedance means disposed to respond to the temperature of said flowing liquid after being heated by passing said electrical current therethrough and being connected to said ramp generator means to modulate the amplitude of said sawtooth wave form in response to the instantaneous temperature of the heated liquid;

reference signal means for producing a reference signal representing a preselected reference temperature; and comparator means connected to said reference signal means and to said romp generator means to produce a switching signal for triggering said alternating current switching means through said logic circuit means when the amplitude of said modulated sawtooth wave form exceeds said reference temperature signal.

4. Apparatus for controlled heating of an electrical resistance having a resistivity which varies with time, comprising:

terminal means adapted for connection to a source of alternating current;

triggerable alternating current switching means connecting said terminal means to said resistance for selectively applying said alternating current to said resistance;

current sensing means for sensing the magnitude of current flow through said resistance;

temperature sensing and comparing means for sensing the temperature associated with said resistance after being heated by said current flow and electrically comparing said temperature with a preselected reference temperature; and logic circuit means having inputs connected to said current sensing means and to said temperature sensing and comparing means and having an output connected to and for controlling said switching means for conditioning said switching means to pass said alternating current to said resistance only during intervals when said current sensing means senses a current flow below a preselected maximum current and concurrently therewith said temperature sensing and comparing means senses a temperature associated with said resistance below said preselected reference temperature, whereby said alternating current is passed through said resistance causing an increase in temperature thereof until said preselected reference temperature is attained whereafter said alternating current is applied intermittently to maintain said preselected reference temperature unless excessive current flow is encountered by reason of a change in the resistivity of said resistance where upon said current flow is limited to said maximum current level with a concomitant decrease in the temperature level of said resistance below said preselected reference temperature, said triggerable alternating current switching means comprising:

a solid state triac device connected in series with said electrodes;

zero crossover detector means adapted for connection to said source of alternating current for issuing a train of electrical pulses representing in time the zero crossing of said alternating current; and trigger circuit means connected to said triac and to said logic circuit means for receiving said train of electrical pulses for triggering said triac to pass said alternating current to said electrodes for at least one half cycle of said alternating current following each such electrical pulse, whereby said triac is conditioned to pass a minimum quanta of electrical energy consisting of at least one half cycle of said alternating current in response to each pulse signal passed by said logic circuit means in accordance with the inputs thereto from said current sensing means and said temperature sensing and comparing means.

5. A device for heating flowing liquid by passing electrical current therethrough, comprising the combination of:

electrode means for contacting said flowing liquid;

electrical switching means adapted for connection to a source of alternating current voltage and connected to said electrode means for selectively applying an alternating current thereto to cause current flow through the liquid for raising the temperature thereof; and control logic means and sensing means for sensing a predetermined condition of operation of said device, said control logic means connected to said electrical switching means and to said sensing means to selectively condition said electrical switching means, said sensing means comprising the combination of:

current sensing and limiting means, and temperature sensing and comparing means, said current sensing and limiting means connecting between said electrode means and said control logic means for sensing the current flow between said electrode means and conditioning said control logic means to inhibit switching of said electrode switching means in the event the sense current exceeds a predetermined maximum current level, said temperature sensing and comparing means disposed to sense the temperature of liquid after being heated by current flow between said electrode means and being connected to said control logic means for inhibiting said switching means in the event the temperature of the heated liquid exceeds a predetermined reference temperature level, whereby said current sensing and limiting means and said temperature sensing and comparing means cause said control logic means to conduct only selected or full cycles of said alternating current to said electrodes, whereby said electrodes are energized by intermittently applied quanta of electrical energy consisting of at least one full cycle of said alternating current.

6. In a heating apparatus of the type having electrically energized electrodes for increasing the temperature of electrically resistive liquids by passing electrical current therethrough, the improvement comprising:
an electrical circuit for energizing said electrodes to cause said current flow through said liquid for raising the temperature thereof to a preselected temperature comprising:
a source of alternating current,
alternating current switching means connected between said source of alternating current and said electrodes for selectively conducting said alternating current to said electrodes,
trigger circuit means connected to and for triggering said switching means to conduct said alternating current,
zero crossover detector means adapted for connection to said source of alternating current for issuing a train of electrical pulses representing in time the zero crossing of said alternating current,
temperature sensing means disposed for sensing the temperature of said liquid after being heated by current flow between said electrodes,
reference temperature signal means,
comparator means connected to said temperature sensing means and to said reference temperature signal means and having an output for providing an output signal when said temperature sensing means senses a temperature of said liquid below said preselected temperature established by said reference temperature signal means,
current sensing means for sensing the magnitude of current flow through said resistive liquid;
logic circuit means having a first input connected to said current sensing means and a second input connected to said comparator means for receiving the output signal of said comparator means and a third input connected to said zero crossover detector means, said logic circuit means being connected to and for conditioning said trigger circuit means to trigger said switching means to apply said alternating current to said electrodes only during intervals when said zero crossover detector means activates said logic circuit means and said current sensing means senses a current flow below a preselected maximum current and concurrently therewith said temperature sensing means senses a temperature below said preselected temperature established by said reference temperature signal means.

7. The device defined in claim 6 further comprising:
circuit means connected between said logic circuit means and said alternating current switching means for causing said alternating current switching means to conduct for one or more full cycles of said alternating current in response to said control logic means, whereby the minimum or quanta of electrical energy applied at any given time to said electrodes consists of one full cycle of said alternating current.

* * * * *